United States Patent
Paranjpe et al.

(10) Patent No.: US 10,140,089 B1
(45) Date of Patent: Nov. 27, 2018

(54) SYNTHETIC SPEECH FOR IN VEHICLE COMMUNICATION

(71) Applicants: 2236008 Ontario Inc., Waterloo (CA); BlackBerry Limited, Waterloo (CA)

(72) Inventors: Shreyas Paranjpe, Vancouver (CA); Phillip Alan Hetherington, Port Moody (CA); Leonard Charles Layton, Vancouver (CA)

(73) Assignees: 2236008 Ontario Inc., Waterloo, Ontario (CA); BlackBerry Limited, Waterloo, Ontario (CA)

(*) Notice: Subject to any disclaimer, the term of this patent is extended or adjusted under 35 U.S.C. 154(b) by 0 days.

(21) Appl. No.: 15/672,808

(22) Filed: Aug. 9, 2017

(51) Int. Cl.
| | |
|---|---|
| H04B 3/20 | (2006.01) |
| G10L 21/00 | (2013.01) |
| G10L 21/0208 | (2013.01) |
| G10L 13/04 | (2013.01) |
| G10L 15/20 | (2006.01) |
| G06F 3/16 | (2006.01) |
| G10L 21/02 | (2013.01) |

(52) U.S. Cl.
CPC .............. *G06F 3/167* (2013.01); *G10L 21/02* (2013.01); *G10L 2021/02082* (2013.01)

(58) Field of Classification Search
CPC ......... G10L 21/00; G10L 13/00; G10L 13/04; G10L 13/043; G10L 15/00; G10L 15/20; G10L 21/0208; H04B 1/00; H04B 3/20
See application file for complete search history.

(56) References Cited

U.S. PATENT DOCUMENTS

| | | | | |
|---|---|---|---|---|
| 6,415,253 | B1* | 7/2002 | Johnson | G10L 21/0208 381/94.2 |
| 7,117,145 | B1* | 10/2006 | Venkatesh | G10L 21/0208 704/200 |
| 7,171,003 | B1* | 1/2007 | Venkatesh | H03G 3/32 381/66 |
| 7,302,062 | B2* | 11/2007 | Christoph | H03G 3/32 381/103 |
| 8,116,481 | B2* | 2/2012 | Christoph | H03G 3/32 381/71.1 |
| 8,862,472 | B2 | 10/2014 | Wilfart et al. | |
| 9,264,824 | B2 | 2/2016 | Pruthi et al. | |
| 9,613,633 | B2* | 4/2017 | Krini | G10L 21/0208 |
| 9,875,755 | B2* | 1/2018 | Nakadai | G10L 21/0232 |
| 2007/0118360 | A1* | 5/2007 | Hetherington | G10L 21/0208 704/206 |
| 2009/0022330 | A1* | 1/2009 | Haulick | H04M 9/082 381/57 |
| 2010/0057465 | A1 | 3/2010 | Kirsch et al. | |
| 2010/0189275 | A1* | 7/2010 | Christoph | H04R 3/005 381/66 |
| 2014/0213550 | A1* | 7/2014 | Hoye | A61K 9/0019 514/63 |
| 2018/0075859 | A1* | 3/2018 | Song | G10L 19/06 |

* cited by examiner

*Primary Examiner* — Blane Jackson
(74) *Attorney, Agent, or Firm* — Rowand LLP

(57) ABSTRACT

A system and method that enhances spoken utterances by capturing one or more microphone signals. The system and method estimates a plurality of echo paths from each of the one or more microphone signals and synthesizes a speech reinforcement signal in response to and corresponding to the one or more microphone signals. The system and method concatenates portions of the synthesized reinforcement signal with the captured microphone signals and processes the captured microphone signals in response to the estimated plurality of echo paths.

20 Claims, 7 Drawing Sheets

SYNTHETIC SPEECH FOR IN VEHICLE COMMUNICATION

BACKGROUND OF THE DISCLOSURE

1. Technical Field

This disclosure relates to processing audio signals and in particular, to systems and methods that reinforce speech.

2. Related Art

In-vehicle systems may improve communication between occupants. The systems capture signals and replay the captured signals within a vehicle. Minimizing delay when replaying the captured signals can be important to preserving the naturalness of the signals. However, replaying a speaker's voice in close proximity to the intended recipient may cause the recipient to perceive a driver's voice from many locations. In many cases, the perception of the driver's voice coming from different locations and the amplification of the noise surrounding the driver's voice can be distracting.

BRIEF DESCRIPTION OF THE DRAWINGS

The disclosure is better understood with reference to the following drawings and description. The elements in the figures are not necessarily to scale, emphasis instead being placed upon illustrating the principles of the disclosure. Moreover, in the figures, like referenced numerals designate corresponding parts throughout the different views.

DETAILED DESCRIPTION

Synthetic speech reinforcement systems improve communication between vehicle occupants by reinforcing signals captured by microphones and synthesizing speech signals that are transmitted through audio transducers. The speech reinforcement systems compensate for noisy conditions by capturing a talker's voice, synthesizing speech corresponding to the talker's voice, and then rendering the synthesized speech as a reinforcement via the in-vehicle loudspeakers (e.g., the front or rear transducers) that may be located near the intended listener. In operation, the intended listener perceives the front or rear transducers that source the synthesized reinforcing signals to be spatially located in substantially the same spatial location as the active talker. Through speech and vocal tract models and/or adaptive learning, self-organization, and real-time operations, a speech synthesizer or neural network synthesizes the signals that reinforce speech with minimal delay at an amplitude that maintains the naturalness of the speech. While microphones effectively record utterances from the talker of interest, they also capture undesired sounds such as noise, speech from other active in-vehicle talkers, and other audio sounds created by the vehicle's loudspeakers such as music that may hide speech. The small sizes of vehicle cabins and the driver and passenger's close proximity to one another can also cause acoustic coupling. The disclosed systems and processes (referred to as a system or systems) mediate these issues.

Figure 1:
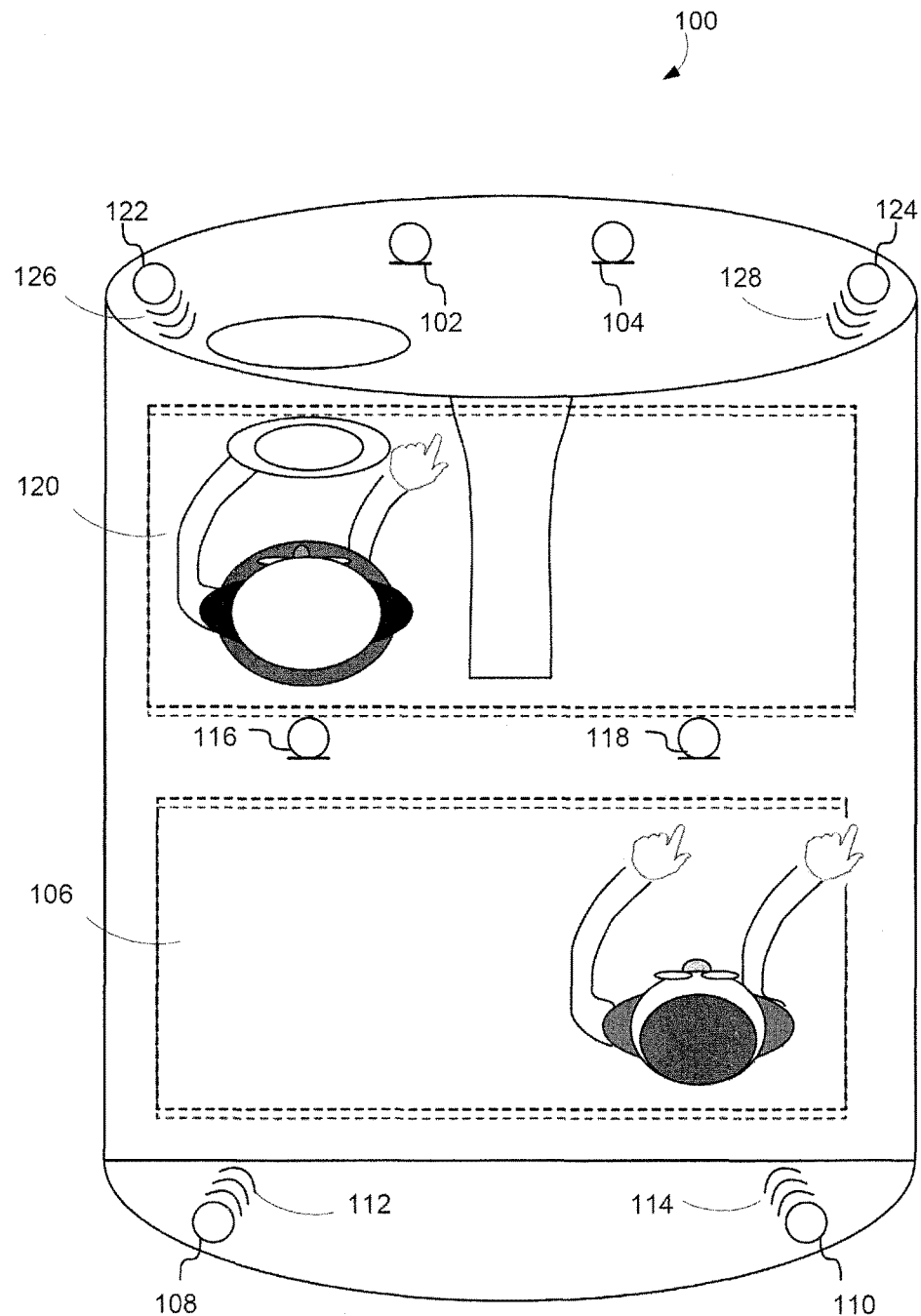
FIG. 1 is an overhead view of a vehicle with a synthetic speech reinforcement system.

In FIG. 1, a synthetic speech reinforcement system is a unitary part of a vehicle 100. In other systems, it is an accessory, and in other systems, it is part of an occupied space outside of a vehicle both of which may be divided into zones. In FIG. 1, the driver and one or more co-driver's (not shown) signals are captured by microphones 102 and 104 and thereafter synthesized into reinforcing signals that are rendered in rear zone 106 through loudspeakers 108 and 110. These loudspeakers 108 and 110 provide full or partial front-to-back synthesized audible reinforcing signals 112 and 114. Likewise, one or more rear microphone signals are captured by microphones 116 and 118, and thereafter processed to synthesize full or partial audible reinforcing signals in the front zone 120 through loudspeakers 122 and 124. These loudspeakers provide back-to-front re-enforcing signals 126 and 128. In FIG. 1 the driver and co-driver's (not shown) voices are reinforced for the benefit of passengers in the rear zone 106; this is known as a front-to-back reinforcement. The rear passengers' voices are reinforced for the benefit of the driver in the front zone 120; this is known as back-to-front reinforcement.

In the front-to-back and in the back-to-front reinforcements, sound reflections or echo is minimized when in-vehicle microphones capture the reinforcement signals. Non-synthesized reinforced voice output is not simply replayed through vehicle transducers. Instead, when the microphones and speech synthesizer and/or neural network captures talker's voice and possibly reinforcing reflections of prior speech that may accompany it, the system synthesizes only targeted voice segments. It does not simply pass or render speech from the captured signals. By synthesizing only targeted voice segments into synthetic reinforced voice output, the reinforcement of the targeted voice segments themselves minimize echo, ringing, and howling. Some speech synthesizers and/or neural networks incorporate speech models and vocal track models that may include the talker's human voice characteristics. The models may be used to infer missing words and render a partial synthetic voice output concatenated with a non-synthesized voice reinforcement. In other systems, the speech reinforcement system may render a synthetic voice output exclusively.

Figure 2:
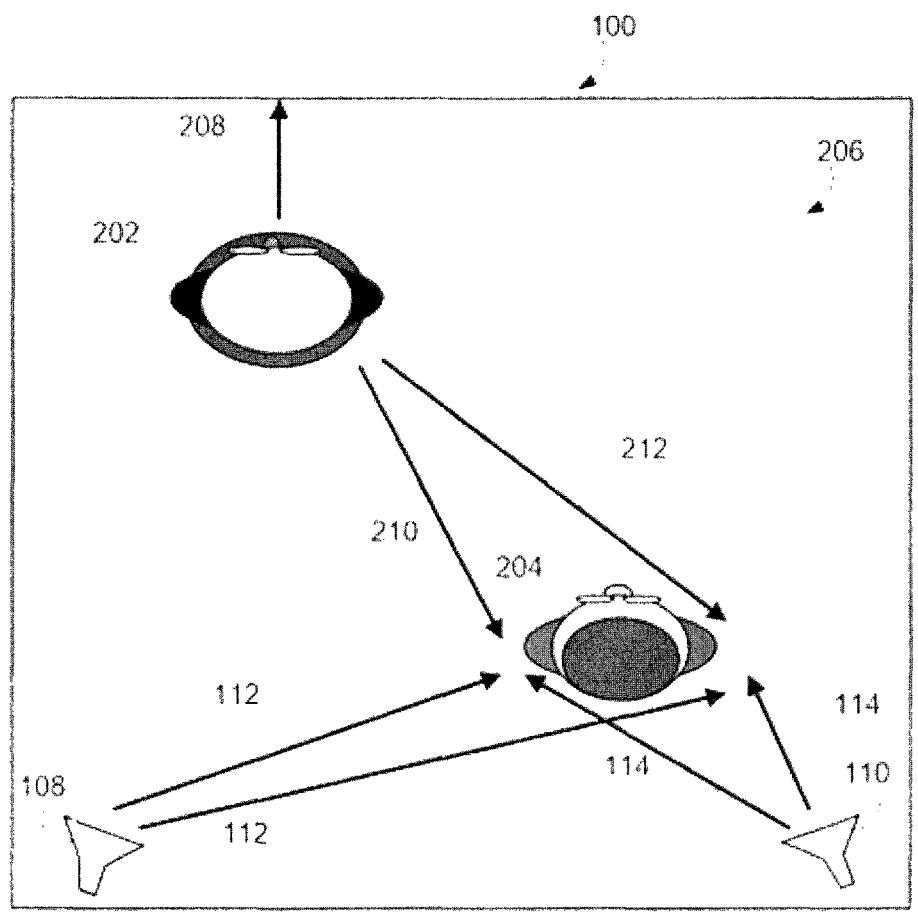
FIG. 2 is a second overhead view of a vehicle with a synthetic speech reinforcement system.

FIG. 2 is a second overhead view of a vehicle 100 with a synthetic speech reinforcement system. The system configuration includes a driver or an audio source 202, an occupant, or a listener 204, two or more audio transducers 108 and 110 (collectively or generically referred to as the rear audio transducers) and a vehicle cabin, or an acoustic environment 208. The microphones and speech synthesizer and/or neural network (not shown), capture audio signal 208, 210 and 212 generated by the audio source 202. The system synthesizes and renders all or portions of captured audio signal using the audio transducers 108 and 110. The audio transducers 108 and 110 reinforce the captured audio signal by rendering reinforcement audio signals 112 and 114 to improve communication between the audio source 202 and the listener 204. The listener 204 receives reinforcement audio signals 112 and 114 from audio transducers 108 and 110, respectively.

Figure 3:
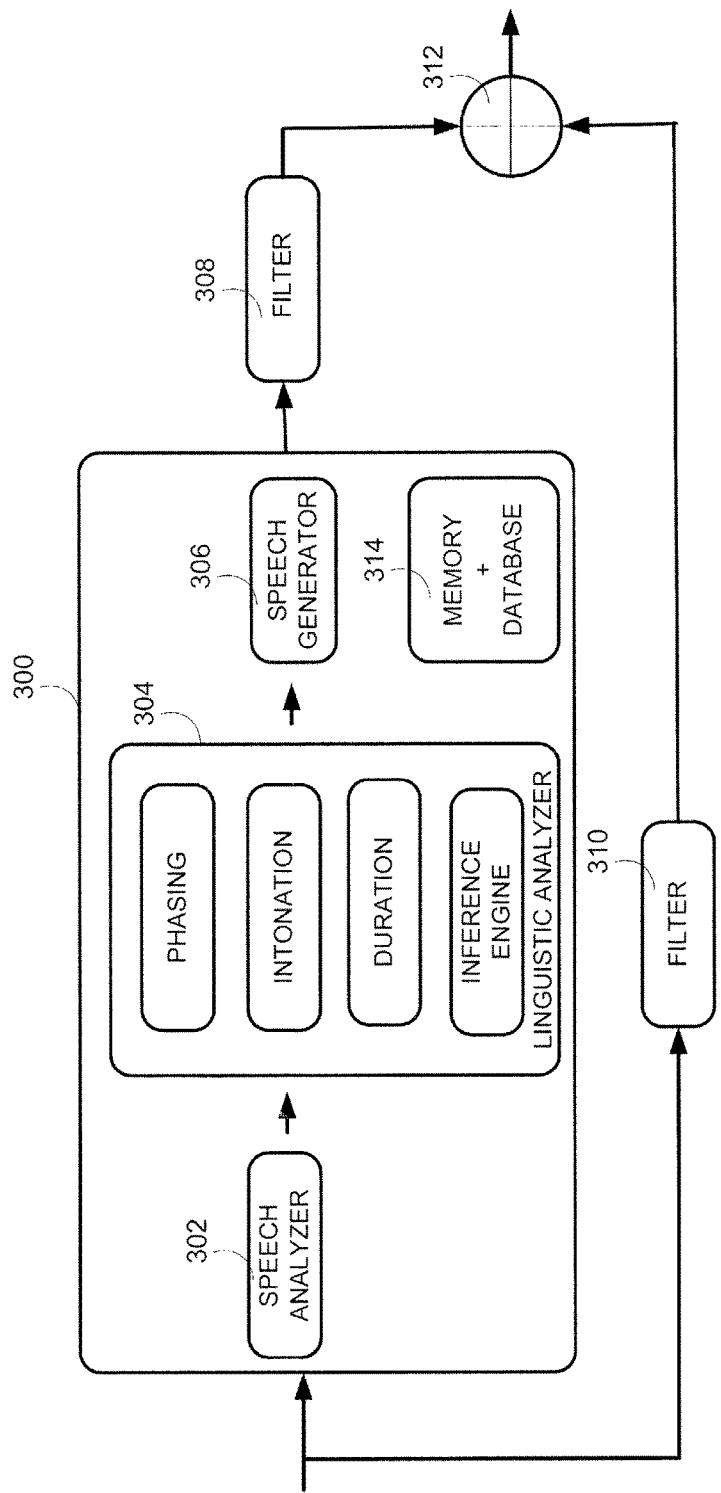
FIG. 3 is a block diagram of a speech synthesizer/neural network.

FIG. 3 is a speech synthesizer/neural network 300 in a concatenating configuration. In FIG. 3, a synthesized speech is mixed with contemporaneous non-synthesized speech to render a hybrid-reinforcing signal in the time domain on a sample-by-sample basis. In the pre-processing stage of FIG. 3, a speech analyzer 302 processes the audio input. It identifies phrases, clauses, and sentences. In some systems, the speech analyzer 302 assigns phonetic transcriptions to the phrases, clauses, and sentences that are processed by the linguistic analyzer 304. The linguistic analyzer 304 identifies the phasing, intonation, and/or pitch and duration of the audio input and renders synthetic voice representations of the reinforcing utterance that may be composed of phonemes. When generating speech based on a speech or vocal tract model, the linguistic analyzer 304 may infer portions of the speech from context and generate the hidden components of the speech signal that are hidden by noise or other signals. For example, when a word or sequence of words w are spoken, the linguistic analyzer 304 may compute a score for the missing words w by matching the words that precede or follow the hidden words w that are part of the speech model retained in a memory or database 314. Applying pre-stored linguistic knowledge of what words can or usually follow other words, the linguistic analyzer 304 may select the words or word sequence that has the highest score as the missing words. In some systems, a pronunciation score may be help determine the selection. Once recognized, the speech generator 306 converts the inferred words and synthetic voice representations rendered by the linguistic analyzer 304 into sound. The speech generator 306 also imposes the target prosody derived by the linguistic analyzer 304 on the synthetic voice output generated by the speech generator 306. In FIG. 3, the synthetic voice output is concatenated with portions of the non-synthesized voice output through dynamic filters 308 and 310 and a mixer 312. Dynamic filter 308 passes the synthetic voice output that are within a desired frequency range (band) and blocks bands above and/or below the desired band. Similarly, dynamic filter 310 passes the non-synthesized voice output that lies outside of the passband of filter 308 but blocks the bands that lie within the passband of filter 308. A mixer 308 combines the output of dynamic filters 308 and 310 to render seamless reinforcement signals.

In FIG. 3, the passbands and stopbands of dynamic filters 308 and 310 may be automatically controlled in response to detected noise levels and/or speech intelligibly thresholds in the vehicle. In these systems, when a noise level meets and/or exceeds a programmable noise threshold in the aural band, the speech synthesizer/neural networks 300 replace the detected noisy bands of the reinforced speech with synthetic voice output corresponding to the voice lying within those noisy bands. Likewise, when intelligibility of the non-synthesized voice reinforcement meets and/or drops below a programmable intelligibility threshold, some speech synthesizer/neural networks 300 replace the unintelligible bands with synthetic voice output corresponding to the voice lying within the unintelligible bands. In these alternative systems, some or the entire non-synthesized voice reinforcement signal may be replaced with a synthetic voice reinforcement signal; this includes multiple non-continuous portions of the reinforcement signal.

Figure 4:
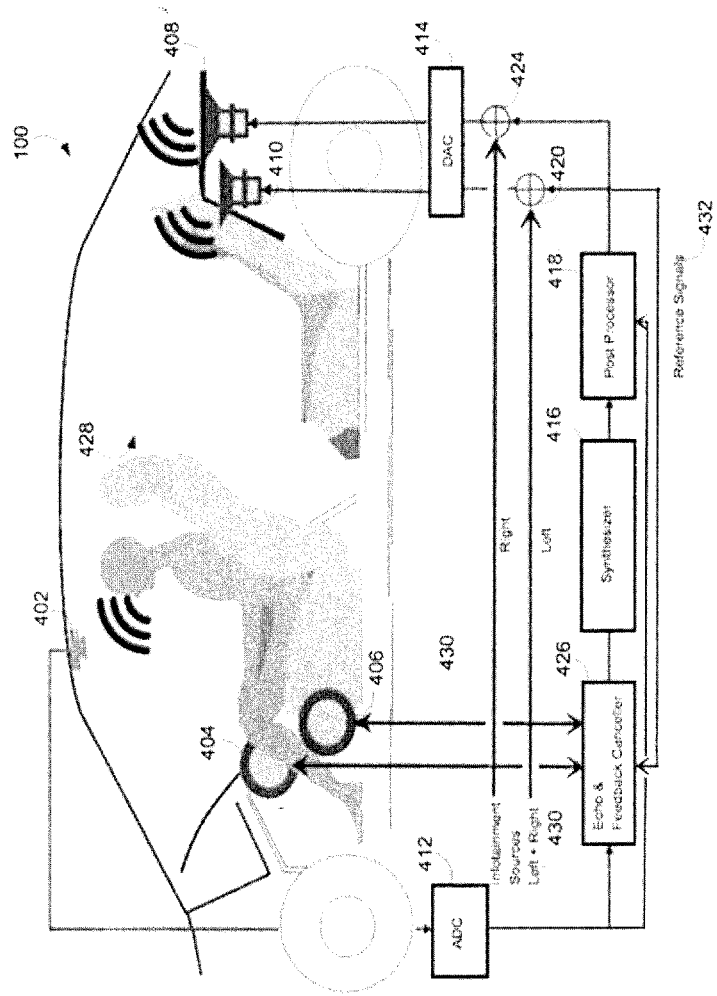
FIG. 4 is a side view of a second vehicle with the synthetic speech reinforcement system.

FIG. 4 is a side view of a vehicle with the synthetic speech reinforcement system operating in a front-to-back reinforcement that may be implemented in a zone-to-zone reinforcement. In FIG. 4, the zones may comprise a front-left (or a driver zone or zone one), a front-right (a co-driver zone or zone two), a rear left (a passenger zone behind the driver or zone three), and a rear-right (a passenger zone behind the co-driver or zone four).

The synthetic speech reinforcement system of FIG. 4 includes a front/driver microphone 402, two front door loudspeakers 404 and 406 and two rear loudspeakers 408 and 410. The synthetic speech reinforcement system also includes a digital to analog converter or DAC 412 and an analog to digital converter or ADC 414. DAC 412 translates digital data into analog signals, and ADC 412 converts continuously varying analog signals into digital data. In FIG. 4, one or more speech synthesizers 416 convert spoken utterances into a synthetic voice reinforcement and a post-processor 418 that concatenates the synthetic voice reinforcement with portions of non-synthesized voice reinforcement to generate the reinforcement signals that may be mixed with infotainment signals via adders 410 and 424. An optional adaptive echo and feedback cancellation module 426 eliminates recurrent distortion and artifacts that may be generated by the synthetic speech reinforcement.

In a multi-directional operation, one or more rear microphones (not shown) are used in a rear zone 428 which allows the system to process and render the rear passenger's reinforced signals over the front loudspeakers 404 and 406 using the processes described herein that reinforces the driver's voice in a front-to-back reinforcement. In other configurations, additional loudspeakers, e.g., tweeters or subwoofers may render the reinforcement signals. In other alternative systems, the stereo infotainment source 430 shown as a two-channel source may comprise one or more channels. For example, some systems within vehicles process six channels such as the six channels used in Dolby 5.1 surround sound.

In the synthetic speech reinforcement system of FIG. 4, the systems may also model signal paths from the J loudspeakers to the M microphones when the optional adaptive echo and feedback cancellation module 426 is used. The system estimates the paths through an impulse response from loudspeaker j to microphone m, —which is $h\_j,m[n]$. The impulse response is estimated by the feedback and echo cancellation module executed by the acoustic processor. Here, "n" is the sample index. In the feedback and echo cancellation module, there are J*M echo paths, so in example vehicle 100 of FIG. 4, there are four desired signal paths in a front-to-back reinforcement. Those paths start at the front left (FL—driver) loudspeaker to the front microphone ($h\_1[n]$), from the front right (FR—co-driver) loudspeaker to the front microphone ($h\_2[n]$), from the rear left (RL—passenger behind the driver) loudspeaker to the front microphone ($h\_3[n]$) and from the rear right (RR—passenger behind the co-driver) loudspeaker to the front microphone ($h\_4[n]$). In this front-to-back reinforcement, in which the reinforced signal is conveyed by a single channel and the infotainment comprises music in stereo the four loudspeaker signals, $x\_1[n]$, $x\_4[n]$ can be represented as:

$x\_1[n]$=FL=music left
$x\_2[n]$=FR=music right
$x\_3[n]$=RL=music left+reinforcement signal
$x\_4[n]$=RR=music right+reinforcement signal and the echo at the front microphone can be represented as:

$$E[n]=x\_1[n]*h\_1[n]+x\_2[n]*h\_2[n]+x\_3[n]*h\_3[n]+x\_4[n]*h\_4[n],$$

where '*' represents convolution in the time-domain.

In FIG. 4, the optional echo and feedback cancellation module 426 estimates the impulse response paths {$h\_j[n]$;

j=1, ..., J} given the reference channels {x_j[n] ]; j=1, ..., J} and the microphone signal Y[n], and then subtracts the echo E[n] from microphone signal Y[n]. In FIG. 4, post processor 418 concatenates the synthetic voice reinforcement output generated by the one or more speech synthesizers 416 with portions of the non-synthesized voice reinforcement output to generate the reinforcement signals that are mixed with infotainment signals.

In FIG. 4, the post processor 418 renders the passbands and stopbands of dynamic filters 308 and 310 of FIG. 3. The passbands and stopbands may be automatically controlled in response to detected noise levels and/or speech intelligibly measures in the vehicle 100. In these systems, when a noise level meets and/or exceeds a programmable noise threshold, the post processor 418 replaces the detected noisy band of the reinforced speech with a synthetic voice reinforcement. Likewise, when intelligibility of non-synthesized voice output meets and/or drops below a programmable intelligibility threshold, the post processor 418 replaces the unintelligible bands with synthetic voice reinforcement.

Some synthesizers 416 incorporate speech models, vocal tract, other models, and other human voice characteristics of the in-vehicle talkers to create a partial or complete synthetic voice reinforcement. These synthesizers 416 operate in the time domain on a sample-by-sample basis and may predict an output based on historical processing. The post-processor 418 may also execute a multiband compressor/expander/limiter that dynamically adjusts the gain of reinforcement signals to match the gain of the audio input and may apply an equalization. The equalization may modify the tone color or timbre and the dynamic gain that adjusts (e.g., amplifies or attenuates) the levels of the reinforced signals. The adapted and equalized signals are then added to the signal sourced by the stereo infotainment source 430 through the signal adder circuits 420 and 424. Thereafter, the reinforced signals are converted into analog signals by DAC 308; and thereafter, transmitted into in the rear zone 428 by the two rear loudspeakers 408 and 410. In FIG. 4, the optional echo and feedback cancellation module 424 includes a closed loop 432 to adjust output.

In another alternative system, the media level sourced by the infotainment sources 432 is measured at the adder 420 and 424, by an application program interface or by a sensor. Based on the measured volume levels, the reinforcement signals may increase relative to the volume levels. In some systems, the measurement is a temporally smoothed root mean square of the media signal after it is filtered by a direct current filter. The filter may have rise and fall smoothing coefficients. In this alternative, the gain applied to the reinforcement signal may start to increase at one set of predetermined thresholds and stops at a maximum gain level at a predetermined threshold. This range ensures that the driver, occupants, or user can hear the active talker. Maximum gain may be programmed to predetermined levels, such as a 7 dB level, for example. In some systems, the range is dynamic such that the gain varies with the gain of the infotainment content.

The acoustic processing system of FIG. 1-4 and the alternatives described herein reinforce and enhance speech and sound naturally without distortion or added noise. The one or more synthesizers 416 of these systems may execute a controlled learning process that converts normal speech into a synthetic voice reinforced output. When modeling a vocal tract and other human voice characteristics, the system may store recorded speech in database 314 during those periods in time when only the local talker is speaking meaning before the reinforcement signals are rendered. The synthesizer 416 may store phones and/or diphones in memory or a database 314 to provide a large output range.

Figure 5:
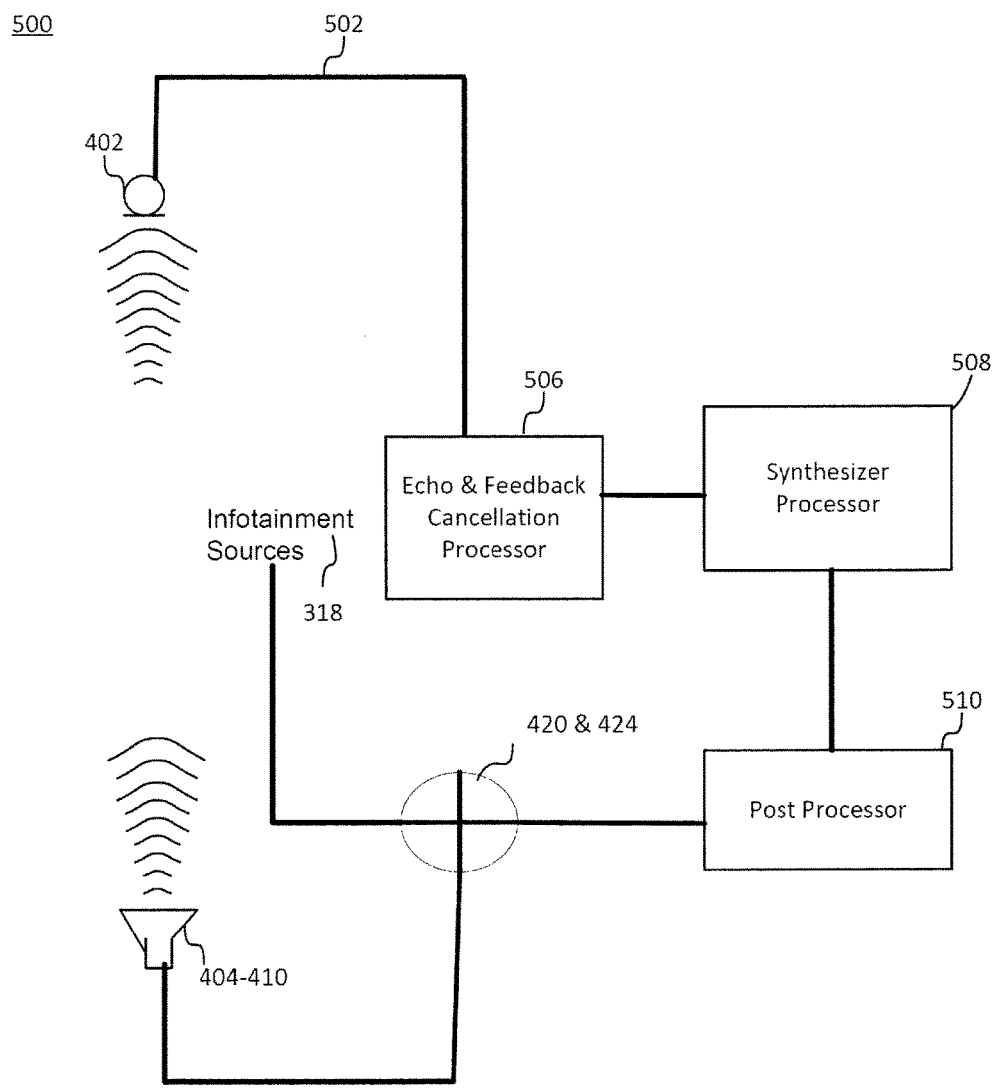
FIG. 5 is a block diagram of a third vehicle with an alternate synthetic speech reinforcement system.

FIG. 5 is a schematic representation of a synthetic speech reinforcement system used in a vehicle. The system includes one or more microphones 502, two or more audio transducers 404-410, an optional echo and feedback cancellation processor 506, a synthesizer processor 508, a noise reduction and a post processor 510. The one or more microphones 502 may capture the audio signal associated with the audio source and the infotainment sources 430 creating one or more captured audio signal 502. The synthesizer processor 508 convert spoken utterances into a synthetic voice reinforcement that makes the reinforced signals natural and intelligible.

The optional echo and feedback processor 506 cancels feedback and echo by modeling the physical paths to the microphones. The echo and feedback processor 506 estimates the echo within the vehicle environment based on these models and subtracts the estimated echo from the signals received from the one or more microphones 502. The post processor 510 renders the passbands and stopbands that pass or block the synthesized speech reinforcement and adjusts the level of the signal rendered by the synthesizer processor 508 in response to the noise level or intelligibility levels detected in the vehicle 500. The passbands and stopbands may be automatically controlled in response to the detected noise levels and/or speech intelligibly measures in the vehicle 500. In these systems, when a noise level meets and/or exceeds a programmable noise threshold, the post processor 510 replaces the detected noisy band of the reinforced speech with a synthetic voice reinforcement. Likewise, when intelligibility of non-synthesized voice output meets and/or drops below a programmable intelligibility threshold, the post processor 510 replaces the unintelligible bands with synthetic voice reinforcement.

The adaptive gain applied by the post processor 510 adjusts the level of the reinforced signal rendered. The gains and equalization applied by post processor 510 may be adjusted for any zone or zones based on the noise and/or speech level measured or estimated in each zone or zones. So, for example, if the voice in zone one (e.g., the driver's zone) is greater than the noise in zone two (e.g., the co-driver's zone), then the gain of the signal arising from another zone, such as zone four (the passenger zone behind the co-driver) will be higher when rendered in zone one than when rendered in zone two. The adapted and equalized reinforced signal is added to the signal sourced by the stereo infotainment source 318 through the signal adder circuits 420 and 424, respectively. Thereafter, enhanced echo reduced signal is converted into analog signals and transmitted by one or more transducers 404-410.

Figure 6:
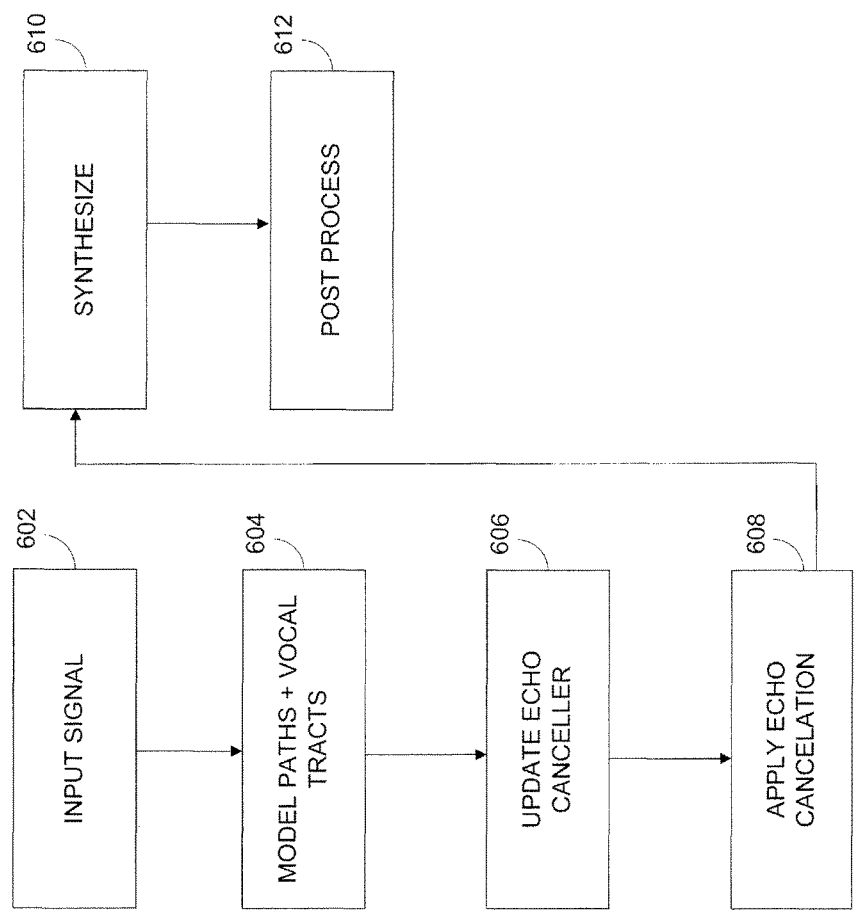
FIG. 6 is a synthetic speech reinforcement process.

FIG. 6 is synthetic speech reinforcement communication process. The process may be implemented using any of the systems and functions described herein with reference to FIGS. 1-5. The process reinforces and enhances communication by mixing synthesized speech with contemporaneous non-synthesized speech to render a reinforcing signal in the time domain. The process samples the speech input at 602. At 604, the process receives the speech model and models the vocal tract and other human voice characteristics of the in-vehicle talkers. The process also models the physical paths from the loudspeakers to the microphones at 604. The process then updates the echo canceller coefficients per each reference signal and each microphone. In a front-to-each reinforcement process modeling a stereo signal and a reinforcement signal, an exemplary process models four paths to the microphone. The echo canceller coefficients to be updated at 606 may be Finite Impulse Response (FIR) or Infinite Impulse Response (IIR) adaptive filter coefficients per each microphone and each loudspeaker pair. In the example described in FIG. 4, there are four loudspeakers, one microphone, and therefore four sets of echo canceller coefficients that are updated in 606. At 608, the process calculates or estimates the contributed echo from each of the loudspeakers and subtracts it from the signal received at the microphone. At 610, a speech synthesis process or neural network process generates targeted synthetic voice output as previously described based on and in response to the sampled speech input at 614. The speech synthesis process or neural network process also imposes the prosody derived from the vocal tract models and other monitored or programmed human voice characteristics at 604. The synthetic voice output generated by the speech synthesis process or neural network process is then concatenated with portions of the non-synthesized voice output through the post processing dynamic filtering previously described at 612. The process may render a partial or entirely synthetic reinforcing signal.

Figure 7:
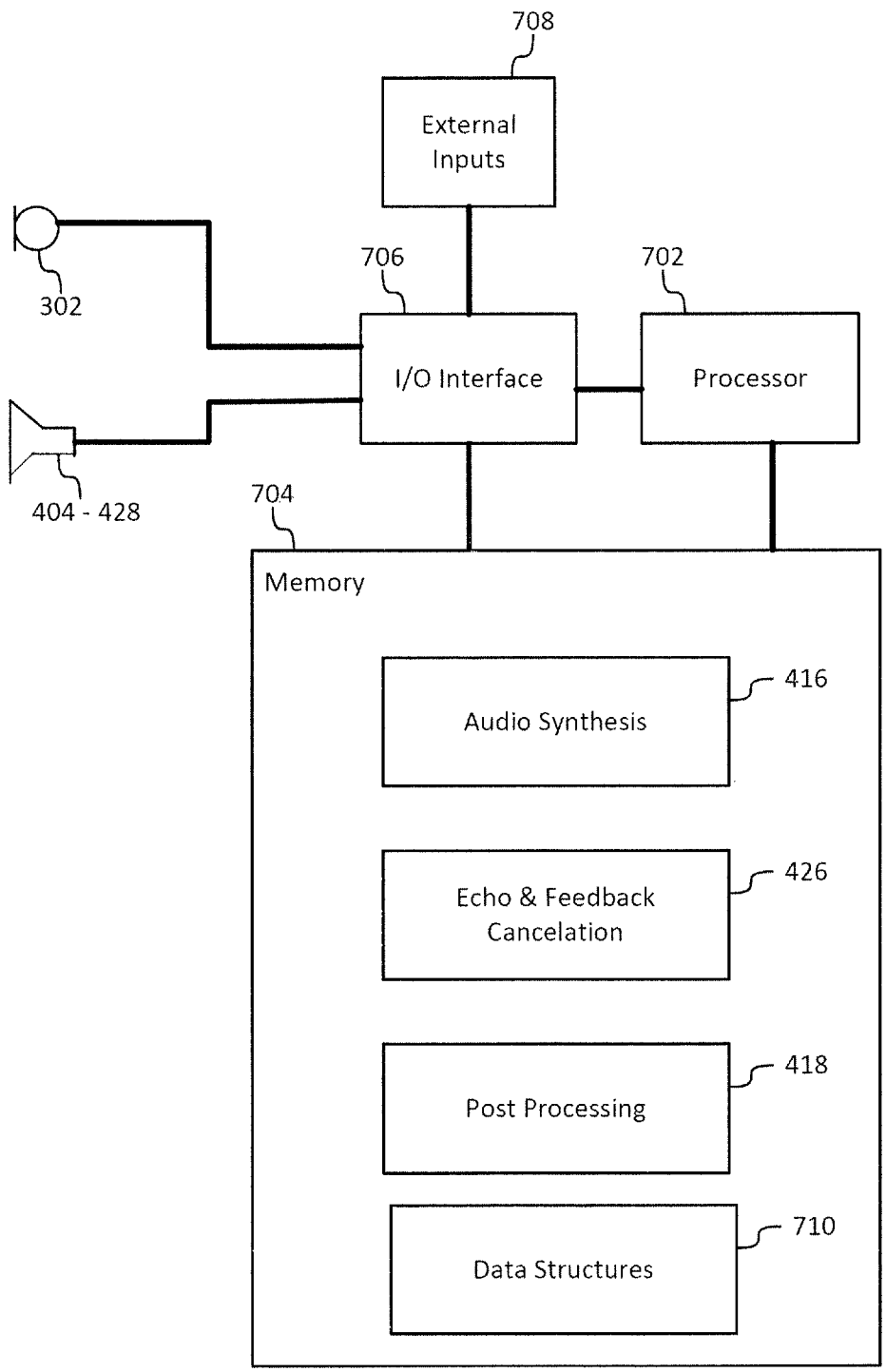
FIG. 7 is a block diagram of a fourth vehicle with a second alternate synthetic speech reinforcement system.

FIG. 7 is a block diagram of a vehicle with a second alternate synthetic speech reinforcement system. The system comprises a processor 702, a non-transitory media such as a memory 704 (the contents of which are accessible by the processor 702) and an I/O interface 706. The I/O interface 706 that may be used to connect devices such as, for example, additional microphones, audio transducers or loudspeakers, and receive external inputs 708 from other local or remote sources. The memory 704 may store instructions which when executed by the processor 702 causes the system to render some or all of the functionality associated with the synthetic speech reinforcement as described herein. For example, the memory 704 may store instructions which when executed by the processor 702 causes the system to render the functionality associated with synthesizing speech reinforcement 416, reducing echo and feedback cancellation 426, and post processing 418. In addition, data structures, temporary variables and other information may store data in the memory 704.

Alternative systems and processes to those shown in FIGS. 1-7 generate a synthetic voice reinforcement output without modeling the vocal tract or monitoring other human voice characteristics of the active talker's voice. In these alternatives, the synthesizer 416 and/or speech synthesizer/neural network and/or synthesizer processor 508 incorporate previously created (and stored) models, vocal tract models, and/or other human characteristics with the speech models to render a partial or completely synthetic voice reinforcement output. In yet another alternative, not all reinforcing signals are rendered through vehicle transducers. In some instances, output is rendered through headphones, focused directional audio speakers, or other devices that do not bleed sound into other zones. In these use cases, the optional echo and feedback cancellation is not used in the isolated zones.

The processors 506-510 and 702 may comprise a single processor or multiple processors that may be disposed on a single chip, on multiple devices or distributed over more than one system. The processors 506-510 and 702 may be hardware that executes computer executable instructions or computer code embodied in the memory 704 or in other memory to perform one or more features of the systems described herein. The processors 506-510 and 702 may include a central processing unit (CPU), a graphics processing unit (GPU), an application specific integrated circuit (ASIC), a digital signal processor (DSP), a field programmable gate array (FPGA), a digital circuit, an analog circuit, a microcontroller, any other type of processor, or any combination thereof.

The memory 314 and 704 and/or storage disclosed may retain an ordered listing of executable instructions for implementing the functions described above. The machine-readable medium may selectively be, but not limited to, an electronic, a magnetic, an optical, an electromagnetic, an infrared, or a semiconductor medium. A non-exhaustive list of examples of a machine-readable medium includes: a portable magnetic or optical disk, a volatile memory, such as a Random Access Memory (RAM), a Read-Only Memory (ROM), an Erasable Programmable Read-Only Memory (EPROM or Flash memory), or a database management system. The memory 314 and 704 may comprise a single device or multiple devices that may be disposed on one or more dedicated memory devices or on a processor or other similar device. When functions or steps are said to be "responsive to" or occur "in response to" a function or a process, the device functions or steps necessarily occur as a result of the function or message. It is not sufficient that a function or act merely follow or occur subsequent to another. Further, when functions indicate an echo cancellation, echo is removed by subtracting an estimated echo from the transmitted or received signal.

The memory 314 and 704 may also store a non-transitory computer code, executable by processor 704, the synthesizer processor 508, the optional echo and feedback cancellation processor 506, and the post processor 510. The computer code may include instructions executable with the processors 506-510 and 702. The computer code may be written in any computer language, such as C, C++, assembly language, channel program code, and/or any combination of computer languages. The memory 314 and/or 704 may store information in data structures including, for example, feedback and or echo canceller coefficients that render or estimate echo signal levels.

The functions, acts or tasks illustrated in the figures or described may be executed in response to one or more sets of logic or instructions stored in or on non-transitory computer readable media as well. The functions, acts or tasks are independent of the particular type of instructions set, storage media, processor or processing strategy and may be performed by software, hardware, integrated circuits, firmware, micro code and the like, operating alone or in combination. In one embodiment, the instructions are stored on a removable media device for reading by local or remote systems. In other embodiments, the logic or instructions are stored in a remote location for transfer through a computer network or over wireless or tangible telephone or communication lines. In yet other embodiments, the logic or instructions may be stored within a given computer such as, for example, a CPU.

The systems and processes reinforce and enhance speech without distortion or adding noise by synthetically generating the reinforcement signal. The systems may synthetically generate speech based on speech and vocal tact models, so speech is reconstructed and, in some systems inferred by identifying the missing components of the speech signal that may be hidden by noise or not directly detectable by executing a probabilistic process. Because the speech models and vocal tract models incorporated into the speech synthesizer/neural network only contain valid speech sounds, non-speech sounds such the noise heard in a vehicle are not synthesized or passed through when speech is synthetically reinforced. Further, some system are constrained to model and synthesize only a single active talker, rather than multiple talkers simultaneously, thereby preventing "cross-talk" or interfering talkers from being generated, which can be of particular value for speech recognition systems as well as in-vehicle communication systems.

In the reinforcement signals described, the synthesized reinforcement speech is synthetically generated and not just an amplified version of the active talker's input. Rather than only applying a gain that increase the amplitude of a captured signal and result in an echo and feedback loop, the feedback generated by the disclosed systems are substantially reduced because the output signal is a (clean and noise-free) synthetically generated version of the input, whose amplitude may be automatically adjusted for the comfort level and intelligibility level desired by the listeners.

The system and processes are fully automated such that the amount of synthesized reinforcement may be continuously adapted to the noise level and or intelligibility estimated within the vehicle cabin and the signal isolation may be adapted to the active talkers in the vehicle. So as different noise conditions occur, the synthetic reinforcement is immediately and smoothly adjusted and the occupants do not need to operate any controls at all. The system eliminates howl and the unpleasant perceptible effects of echo and provides active signal enhancements. The system can be implemented outside of or within vehicle systems such as an infotainment processor and digital signal processors or DSPs and co-exist and communicate with other system software. A vehicle may comprise, without limitation, a car, bus, truck, tractor, motorcycle, bicycle, tricycle, quadricycle, or other cycle, ship, submarine, boat or other watercraft, helicopter, drone, airplane or other aircraft, train, tram or other railed vehicle, spaceplane or other spacecraft, and any other type of vehicle whether currently existing or after-arising this disclosure. In other words, it comprises a device or structure for transporting persons or things. The system is easy and quickly adapted to different vehicle and cabin types and different acoustic environments configurations.

Other systems, methods, features and advantages will be, or will become, apparent to one with skill in the art upon examination of the figures and detailed description. It is intended that all such additional systems, methods, features and advantages be included within this description, be within the scope of the disclosure, and be protected by the following claims.

What is claimed is:

1. A method that enhances voice through synthetic speech reinforcement comprising:
    capturing one or more microphone signals;
    estimating a plurality of echo paths from each of the one or more microphone signals;
    synthesizing a speech reinforcement signal in response to and corresponding to speech detected in the one or more microphone signals, wherein synthesizing the speech reinforcement signal includes inferring the speech reinforcement signal from a linguistic context of the captured one or more microphone signals;
    concatenating portions of the synthesized speech reinforcement signal with the captured microphone signals to render a reinforcement signal; and
    processing the captured microphone signals in response to the estimated plurality of echo paths by subtracting the echo contributions of each of the plurality of echo paths from the captured microphone signals.

2. The method of claim 1 further comprising inferring the speech reinforcement signal from the context of the captured microphone signals that are concealed by noise.

3. The method of claim 2 where the act of inferring the speech reinforcement signal comprises a probabilistic process.

4. The method of claim 2 where the act of inferring the speech reinforcement signal applies a linguistic knowledge pre-stored in a memory.

5. The method of claim 1 where the synthesized speech reinforcement signal contains only valid speech sounds.

6. The method of claim 1 where act of synthesizing a speech reinforcement signal is constrained to a single active talker.

7. The method of claim 1 where the act of concatenating portions of the synthesized reinforcement signal is executed by a plurality of bandpass filters.

8. A non-transitory machine-readable medium encoded with machine-executable instructions, wherein execution of the machine-executable instructions is for:
    capturing one or more microphone signals;
    estimating a plurality of echo paths from each of the one or more microphone signals;
    synthesizing a speech reinforcement signal in response to and corresponding to speech detected in the one or more microphone signals, wherein synthesizing the speech reinforcement signal includes inferring the speech reinforcement signal from a linguistic context of the captured one or more microphone signals;
    concatenating portions of the speech detected in the microphone signals with the synthesized reinforcement signal; and
    processing the captured microphone signals in response to the estimated plurality of echo paths by subtracting the echo contributions of each of the plurality of echo paths from the captured microphone signals.

9. The non-transitory machine-readable medium of claim 8 further comprising machine-executable instructions is for inferring a portion of the speech reinforcement signal from the context of the captured microphone signals concealed by a noise.

10. The non-transitory machine-readable medium of claim 9 where the act of inferring the speech reinforcement signal comprises a probabilistic process.

11. The non-transitory machine-readable medium of claim 9 where the act of inferring the speech reinforcement signal applies a linguistic knowledge pre-stored in a memory.

12. The non-transitory machine-readable medium of claim 8 where the synthesized speech reinforcement signal contains only valid speech sounds.

13. The non-transitory machine-readable medium of claim 8 where act of synthesizing a speech reinforcement signal is constrained to a single active talker.

14. The non-transitory machine-readable medium of claim 8 where the act of concatenating portions of the synthesized reinforcement signal is executed by a plurality of bandpass filters.

15. A system that enhances voice through reinforcement comprising:
    a plurality of microphones capturing one or more microphone signals;
    a processor programmed to estimate a plurality of echo paths from each of the one or more microphone signals;
    the processor further programmed to synthesize a speech reinforcement signal in response to and corresponding to speech detected in the one or more microphone signals, wherein synthesizing the speech reinforcement signal includes inferring the speech reinforcement signal from a linguistic context of the captured one or more microphone signals;

the processor further programmed to concatenate portions of the synthesized reinforcement signal with the speech detected in the captured microphone signals; and the processor further programmed to process the captured microphone signals in response to the estimated plurality of echo paths by subtracting the echo contributions of each of the plurality of echo paths from the captured microphone signals.

16. The system of claim 15 where the processor comprises a neural network.

17. The system of claim 15 where the processor comprises a speech synthesizer.

18. The system of claim 15 where the processor comprises a speech generator.

19. A vehicle that enhances voice through synthetic speech reinforcement comprising:

a plurality of microphones within the vehicle capturing one or more microphone signals;

a processor within the vehicle programmed to estimate a plurality of echo paths from each of the one or more microphone signals;

the processor further programmed to synthesize a speech reinforcement signal in response to and corresponding to speech detected in the one or more microphone signals, wherein synthesizing the speech reinforcement signal includes inferring the speech reinforcement signal from a linguistic context of the captured one or more microphone signals;

the processor further programmed to concatenate portions of the synthesized reinforcement signal with the speech detected in the captured microphone signals; and the processor further programmed to process the captured microphone signals in response to the estimated plurality of echo paths by subtracting the echo contributions of each of the plurality of echo paths from the captured microphone signals.

20. The vehicle of claim 19 where the processor comprises a neural network.

* * * * *